US006973197B2

(12) United States Patent  
Miller

(10) Patent No.: US 6,973,197 B2  
(45) Date of Patent: Dec. 6, 2005

(54) WATERMARKING WITH SEPARATE APPLICATION OF THE GRID AND PAYLOAD SIGNALS

(75) Inventor: Marc Miller, Corte Madera, CA (US)

(73) Assignee: Digimarc Corporation, Beaverton, OR (US)

( * ) Notice: Subject to any disclaimer, the term of this patent is extended or adjusted under 35 U.S.C. 154(b) by 198 days.

(21) Appl. No.: 10/154,621

(22) Filed: May 22, 2002

(65) Prior Publication Data

US 2002/0145759 A1    Oct. 10, 2002

Related U.S. Application Data

(63) Continuation-in-part of application No. 09/694,465, filed on Oct. 23, 2000, now Pat. No. 6,763,122.
(60) Provisional application No. 60/163,676, filed on Nov. 5, 1999.

(51) Int. Cl.$^7$ .............................................. G06K 9/00
(52) U.S. Cl. .................................. 382/100; 358/3.28
(58) Field of Search .............................. 382/100, 151, 382/294; 358/3.28, 1.4, 3.3; 713/176; 283/113

(56) References Cited

U.S. PATENT DOCUMENTS

| | | |
|---|---|---|
| 5,051,835 A | 9/1991 | Bruehl et al. |
| 5,175,425 A | 12/1992 | Spratte et al. |
| 5,390,283 A | 2/1995 | Eshelman et al. |
| 5,509,191 A | 4/1996 | Best |
| 5,530,751 A | 6/1996 | Morris |
| 5,530,759 A | 6/1996 | Braudaway et al. |
| 5,617,119 A | 4/1997 | Briggs et al. |
| 5,654,204 A | 8/1997 | Anderson |
| 5,689,623 A | 11/1997 | Pinard |
| 5,790,703 A | 8/1998 | Wang |
| 5,825,892 A | 10/1998 | Braudaway et al. |

(Continued)

FOREIGN PATENT DOCUMENTS

| | | |
|---|---|---|
| WO | WO02056264 | 7/2002 |
| WO | WO02059712 | 8/2002 |

OTHER PUBLICATIONS

"Video Demystified—A handbook for the Digital Engineer" Second Edition, By Keith Jack, HighText Publications, pp. 39 to 63.

(Continued)

Primary Examiner—Bhavesh M. Mehta  
Assistant Examiner—Barry Choobin  
(74) Attorney, Agent, or Firm—Digimarc Corporation

(57) ABSTRACT

The watermark grid signal and the watermark payload signal are separately applied to an image. The process is particularly useful in situations where variable data such as serial numbers (or other image specific data) is being embedded in a series of images. In such situations the grid signal can be uniform over an entire sequence of images and only the payload signal need be changed before being printed on each image. The time, computational and labor intensive processes can be applied to the task of embedding the grid signal in the image to insure that visual artifacts are not created. After the image has been changed to embed the grid signal, the payload data can be inserted into at least a selected part of the image. Since the payload signal is less likely to create visual artifacts than the uniform grid signal, less effort need be used to avoid creating visual artifacts due to the payload signal. The relatively random nature of the payload data can be relied upon to avoid creating significant visual artifacts. The same bifurcated process can be used to apply digital watermarks to other media such as sound recordings where potential artifacts are in the nature of sound anomalies rather that visual artifacts.

12 Claims, 4 Drawing Sheets

U.S. PATENT DOCUMENTS

| | | | |
|---|---|---|---|
| 5,832,119 A | 11/1998 | Rhoads | |
| 5,835,639 A | 11/1998 | Honsinger et al. | |
| 5,841,978 A | 11/1998 | Rhoads | |
| 5,859,920 A | 1/1999 | Daly et al. | |
| 5,893,101 A | 4/1999 | Balogh et al. | |
| 5,949,055 A | 9/1999 | Fleet et al. | |
| 6,031,914 A | 2/2000 | Tewfik et al. | |
| 6,233,684 B1 * | 5/2001 | Stefik et al. | 713/176 |
| 6,272,176 B1 | 8/2001 | Srinivasan | |
| 6,282,528 B1 | 8/2001 | Schaffer et al. | |
| 6,311,214 B1 | 10/2001 | Rhoads | |
| 6,334,187 B1 | 12/2001 | Kadono | |
| 6,415,977 B1 | 7/2002 | Rumsey | |
| 6,427,020 B1 | 7/2002 | Rhoads | |
| 6,449,367 B2 | 9/2002 | Van Wie et al. | |
| 6,456,726 B1 | 9/2002 | Yu et al. | |
| 6,496,933 B1 | 12/2002 | Nunally | |
| 6,563,935 B1 | 5/2003 | Echizen et al. | |
| 6,570,996 B1 | 5/2003 | Linnartz | |
| 6,735,324 B1 | 5/2004 | McKinley et al. | |
| 6,769,228 B1 | 8/2004 | Mahar | |
| 2001/0024510 A1 | 9/2001 | Iwamura | |
| 2001/0052076 A1 | 12/2001 | Kodono | |
| 2002/0061121 A1 | 5/2002 | Rhoads et al. | |
| 2002/0062442 A1 | 5/2002 | Kurahashi | |
| 2002/0150246 A1 | 10/2002 | Ogino | |
| 2003/0009669 A1 | 1/2003 | White et al. | |
| 2003/0025423 A1 * | 2/2003 | Miller et al. | 312/100 |
| 2003/0056104 A1 * | 3/2003 | Carr et al. | 713/176 |
| 2003/0081779 A1 | 5/2003 | Ogino | |
| 2003/0150922 A1 * | 8/2003 | Hawes | 235/494 |
| 2004/0032972 A1 | 2/2004 | Stach et al. | |
| 2004/0128512 A1 | 7/2004 | Sharma et al. | |
| 2004/0223626 A1 | 11/2004 | Honsinger et al. | |

OTHER PUBLICATIONS

Non-noticeable Information Embedding in Color Images: Marking and Detexcting, b Josep Vidal, Elisa Sayrol, Silvia Cabanillas, Sonia Santamaria, pp. 293-297 0-7803-5247 5/99/$10.00 IEEE.

U.S. Appl. No. 09/571,422, filed May 15, 2000, Rhoads et al.

* cited by examiner

Figure 1A

| +1 | -1 | +5 | -6 | | |
|---|---|---|---|---|---|
| -3 | +8 | -2 | +4 | | |
| | | | | | |
| | | | | | |
| | | | | | |
| | | | | | |

Watermark tile to Insert Grid Signal

Figure 1B

| -1 | -1 | +3 | | | |
|---|---|---|---|---|---|
| +4 | +5 | | | | |
| | | | | | |
| | | | | | |
| | | | | | |
| | | | | | |

Watermark Tile to insert payload data

Figure 2 Watermark tile repeatedly applied to an image
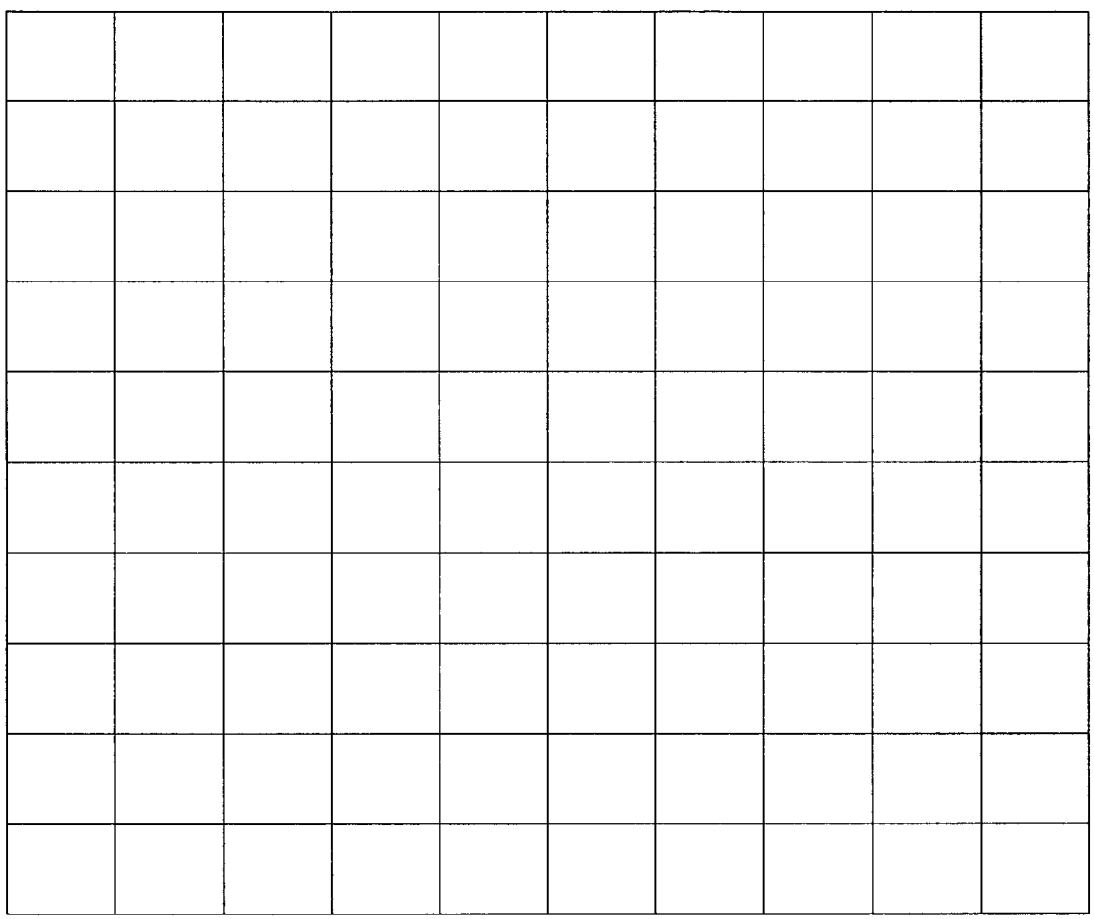

WATERMARKING WITH SEPARATE APPLICATION OF THE GRID AND PAYLOAD SIGNALS

RELATED APPLICATIONS

The present application is a continuation in part of application Ser. No. 09/694,465 filed Oct. 23, 2000 (now U.S. Pat. No. 6,763,122), which is a non-provisional application of provisional application 60/163,676 filed Nov. 5, 1999. The content of the above application and U.S. Patent is hereby incorporated herein.

FIELD OF THE INVENTION

The present invention relates to printing and more particularly to printing watermarked images.

BACKGROUND OF THE INVENTION

The technology for applying digital watermarks to images and for detecting and reading digital watermarks that are embedded in images is well developed. For, examples see issued U.S. Pat. Nos. 6,332,031, 5,721,788, 5,745,604 5,748,783 and 5,768,426. Also see the references cited in the above listed patents. There is a wide variety of literature that describes various digital watermarking techniques.

Many digital watermarks include a grid signal and a payload signal. When a watermark is detected and read, the grid signal is used to determine the orientation and scale of the watermarked image. The payload signal is used to carry data.

In watermarks for images, generally, the grid and payload data together determine the change values in a watermark tile. The watermark tile specifies the changes in the intensity needed to embed a particular watermark in an image. The watermark tile is then applies to multiple area of an image. The process of applying the changes specified by a watermark tile is a complicated process. A wide variety of techniques have been developed to insure that visual artifacts are not created when the changes specified by a watermark tile are made in an image. The techniques used to insure that visual artifacts are not created can be a time, computational and/or labor intensive process.

The grid signal of necessity is a relatively uniform pattern so it is more likely to contribute to the creation of visual artifacts. On the other hand the payload data is not generally a uniform signal and it is less likely to contribute to the creation of visual artifacts.

SUMMARY OF THE PRESENT INVENTION

The present invention separately applies the watermark grid signal and the watermark payload signal to an image. The process of the present invention is particularly useful in situations where variable data such as serial numbers (or other image specific data) is being embedded in a series of images. In such situations the grid signal can be uniform over an entire sequence of images and only the payload signal need be changed before being printed on each image. With the present invention time, computational and labor intensive processes can be applied to the task of embedding the grid signal in the image to insure that visual artifacts are not created. After the image has been changed to embed the grid signal, the payload data can be inserted into at least a selected part of the image. Since the payload signal is less likely to create visual artifacts than the uniform grid signal, less effort need be used to avoid creating visual artifacts due to the payload signal. The relatively random nature of the payload data can be relied upon to avoid creating significant visual artifacts. The same bi-furcated process can be used to apply digital watermarks to other media such as sound recordings where potential artifacts are in the nature of sound anomalies rather than visual artifacts.

DESCRIPTION OF THE FIGURES

FIGS. 1A and 1B illustrate two watermark tiles. One for a grid signal and one for a payload signal.

FIG. 2 illustrates how each watermark tile is embedded multiple times in an image.

DETAILED DESCRIPTION

Two embodiments of the invention will be described. The first embodiment involves applying serial numbers to high quality printed documents such as paper currency. The second embodiment involves applying variable watermark data to documents which are printed at very high speed such as product containers or merchandise coupons. Various alternatives are also described.

Each of the embodiments use a first watermark tile to specify the changes in an area of an image needed to embed a particular grid signal into the image. A second watermark tile is used to specify the changes in an area of an image needed to embed particular payload data into an image. FIG. 1 illustrates two watermark tiles. As is conventional with digital watermarks, the changes specified by the watermark tiles are embedded in multiple areas in an image. FIG. 2 illustrates a watermark tile embedded in an image 1000 times. The figure shows the multiple areas where the tile would be embedded in the image.

The technology for calculating the values for a watermark tile which will embed a particular watermark in an image is known. Likewise the technology for embedding a watermark tile in an image is known. For example see issued U.S. patent U.S. Pat No. 6,345,104, and the references cited therein. It is noted that in the literature related to watermarks, watermarks tiles are sometimes referred to as watermark cells.

Figure 3:
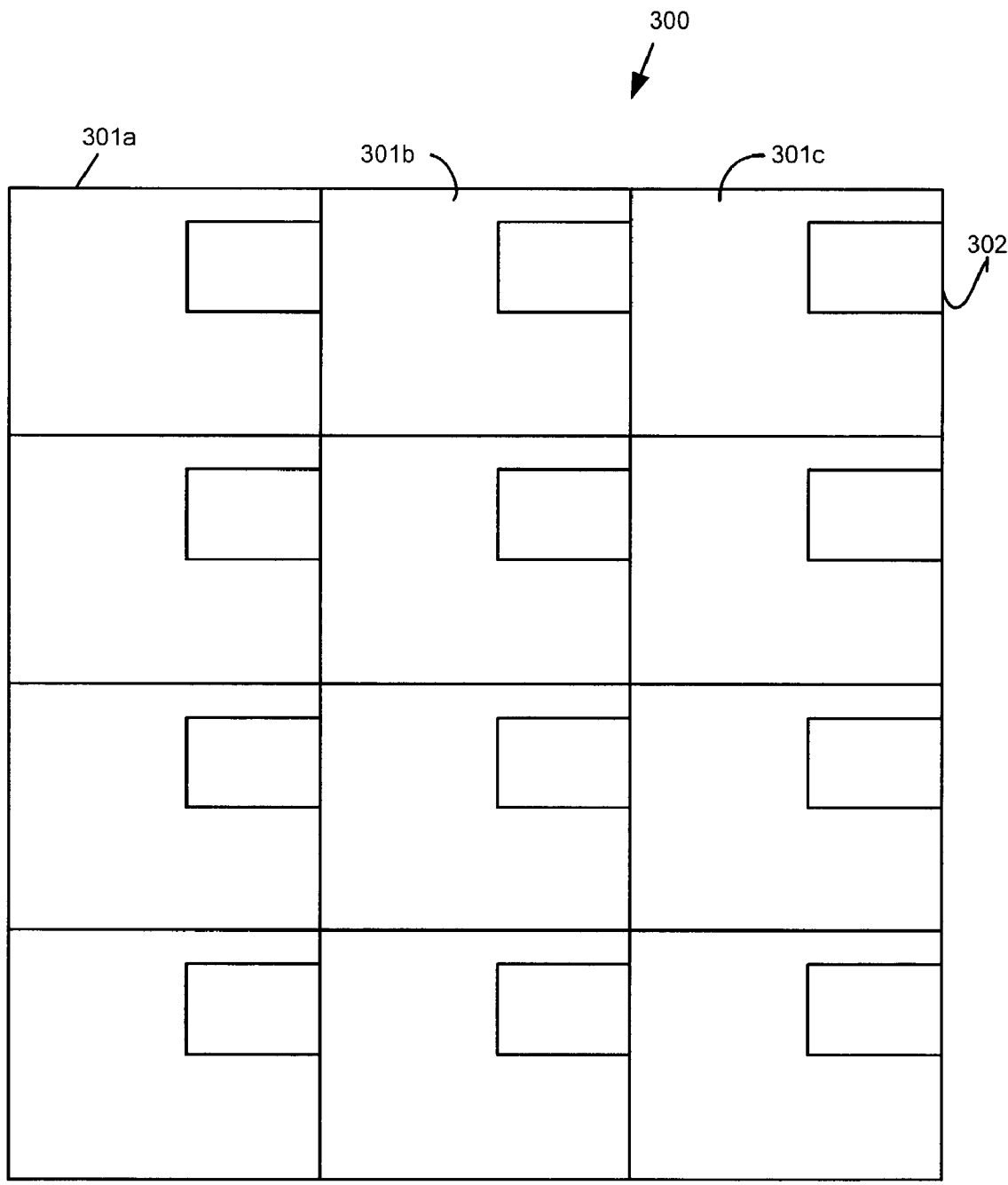
FIG. 3 indicates a sheet of printed images showing a space where a serial number is printed.

The first embodiment of the invention is a method and system for printing high quality images, each of which has a serial number printed in a designated location. FIG. 3 illustrates a sheet 300 of high quality images. The illustrated images could for example be bank notes. Each square 301a, 301b, 301c, etc., represents an image (for example a bank note). Each image has an area 302 which is set aside for a serial number.

Figure 4:
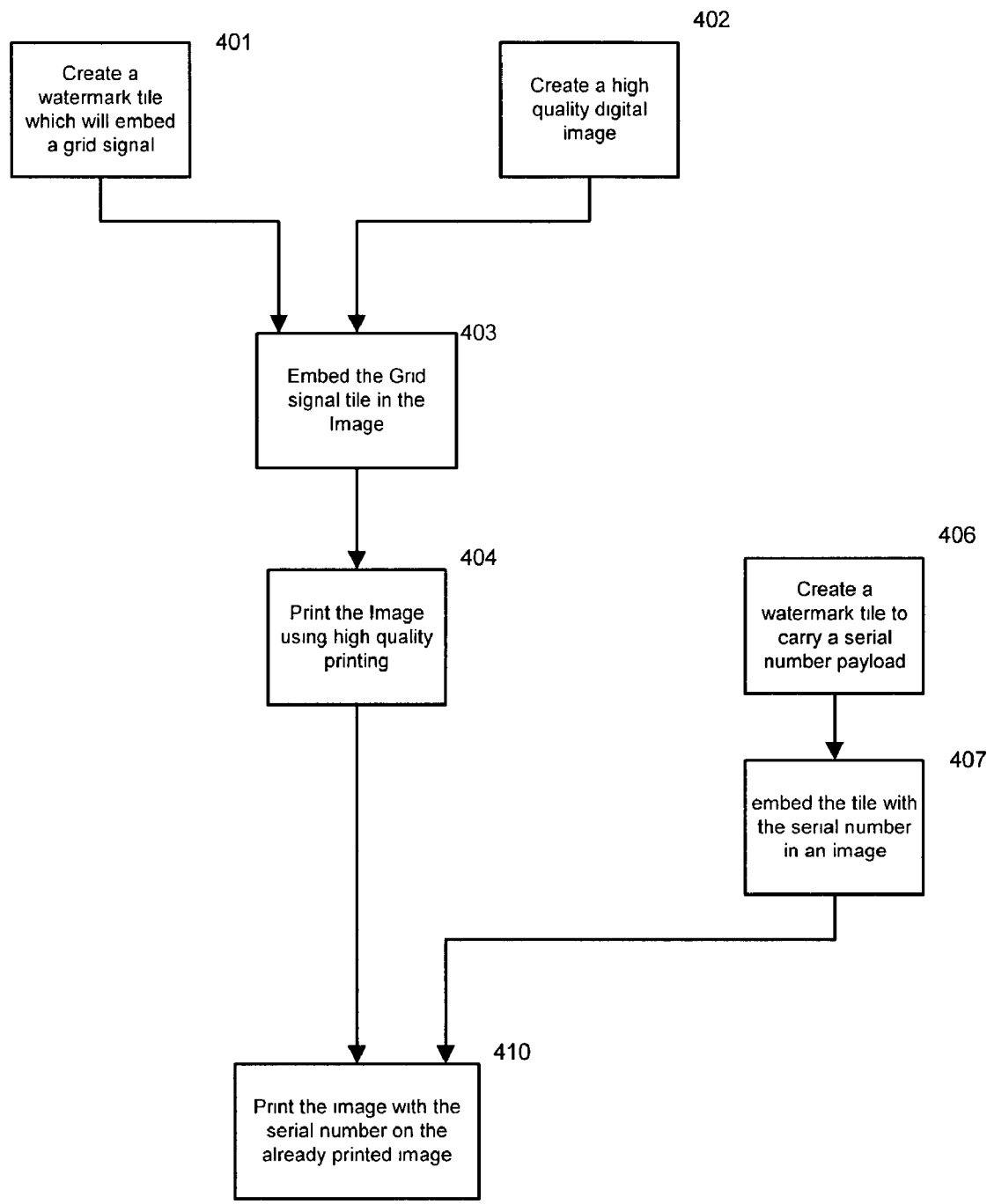
FIG. 4 is a flow diagram illustrating the operation of a first embodiment of the invention.

FIG. 4 is a block diagram of the process for printing such a sheet of serialized images. First as indicated by blocks 401 and 402, a high quality digital image is created and the watermark tile needed to embed a grid signal in the image is calculated. Much care is taken during this step to insure that visual artifacts are not created. Next as indicated by block 403, the image is modified by embedding the watermark grid signal in the image. This can be a time consuming process which can be labor and/or computational intensive. As indicated by block 404, sheets of high quality images are printed using a high quality printing process (for example the type of process normally used to print currency) such as the Simultan offset printing process.

After the high quality images are printed using the high quality printing process, a faster relatively low cost printing process (such as printing using a laser or inkjet printer) is used to print the serial numbers on the images in areas 302. As indicated by block 406 in FIG. 4, the watermark tile needed to carry a serial number is calculated and as indicated by block 407 this serial number is embedded in an image which is designed for areas 302. Finally as indicated by block 410 a high speed printing process is used to print the serial numbers on areas 302. A different serial number is printed in each area 302. Typical printing alignment marks are used to insure that printing occurs at the correct position. The serial number printing can be in an area printed during the previous step or it can be an area that was not printed in the previous step.

The final result is a sheet of images, the major portion of which is printed with a very high quality printing process. A grid signal is carried in the image printed using the high quality printing process. The serial numbers are printed in areas 302 using the high speed (but lower quality) printing process. Embedding a different watermark payload in the relatively small low quality images printed in areas 302 is relatively easy. For a sheet of the size shown, this is done twelve different times. The time consuming and computational difficult process of embedding the grid watermark in areas 301*a*, 301*b*, etc. need only be done once for each sheet.

It is important to note that with the present invention, the image containing the payload data is printed with a defined orientation. The payload containing image is thus aligned with the grid containing image during the printing process. This alignment can be done using conventional printing alignment marks. In many of the prior art watermark reading processes, the grid signal is detected to determine the orientation and the scale of the image. The payload signal is then read using the orientation and scale information obtained from the grid signal. The same type of reading process can take place with watermarks printed utilizing the present invention even though the grid and the payload are printed separately. The reason for this is that the payload containing image is aligned with the grid containing image during the printing process.

The difference in speed between the printing operations need be considered. Each sheet is printed with high quality images containing the watermark grid signal. In the specific example shown in FIG. 3 each sheet has twelve of the high quality images. The grid signal in each of these images is identical. An image with a different watermark payload is printed in each of the twelve areas 302. It can therefore be seen that in a production operation it is desirable that the images with the payload data be printed at a relatively high speed. The present invention accommodates the requirements of these two types of printing.

The watermarks printed utilizing the process of the present invention can be read utilizing standard watermark reading technology. The watermark grid signal is first detected. Then the payload signal is detected and read.

A second embodiment of the invention follows the same steps as that outlined for the first embodiment; however, in the second embodiment, the invention is used for a different application. Consider a manufacturer of high price perfume who wants to serialize the packages for their premium products. The cost of printing single version packages is prohibitively expensive and printed numbers or codes are too overt for a high priced vanity type product.

Utilizing the present invention which separates the grid and payload signals, a large high quality expensive print run of the packaging is performed and then with a lower quality non-expensive printer an image with a variable payload is printed in a selected area of the package without detracting from the aesthetics created by the high quality printing.

In the embodiments described above, the image containing the grid signal was printed first and then, the image containing the payload signal was printed. It is noted that in other embodiments, the image with the payload data could be printed first and then the image with the grid signal could be printed.

While the invention has been described above with respect to printed images, it is noted that the present invention can be applied with respect to other watermarked media such as sound recordings. Furthermore, the invention can also be used in environments that use a wide variety of printing processes.

While the invention has been shown and described with respect to preferred embodiments thereof, it should be understood that various changes in form and detail may be made without departing from the spirit and scope of the invention. Applicant's invention is limited only by the appended claims.

I claim:

1. A method of applying serialized data to a series of documents comprising:

creating a first watermark component including orientation information, creating a series of second watermark components including serialized payload data, embedding the first watermark component in a first image, printing each of a series of documents with the first image using a high quality printing process, embedding the series of second watermark components respectively in a second series of images, and printing the second series of images respectively on the series of documents using a fast printing process.

2. A method of printing a document with digital watermarking comprising:

first printing said document with a watermark including orientation information; and then second printing at least a portion of said document with a watermark including a payload signal.

3. The method recited in claim 2 where said first printing comprises a high quality printing process.

4. The method recited in claim 2 wherein said second printing comprises a high speed printing process.

5. A method of printing a watermarked document comprising:

receiving a first watermark component comprising orientation information, printing the first watermark component on said document, receiving a second watermark component comprising plural-bit payload data, separately printing the second watermark component on said document, said second watermark component being printed in alignment with the printing of said first watermark component, whereby said plural-bit payload can be read from said document by first detecting said orientation information and using at least one of alignment and scale determined from said orientation information to read said plural-bit payload data.

6. The method recited in claim 5 wherein said first watermark component is printed with a high quality printing process.

7. The method recited in claim 5 wherein said plural-bit payload data comprises serialization information.

8. The method recited in claim 5 further comprising printing a plurality of different documents, wherein each of the documents comprises the first watermark component, with each of the documents then comprising a plurality of different plural-bit payloads.

9. The method recited in claim 5 wherein said second watermark component is printed using a high speed printing process.

10. The method recited in claim 6 wherein said plural-bit payload data comprises serialization information.

11. A method of printing a steganographically marked object comprising:

printing first indicia on an object surface, wherein the first indicia includes orientation information steganographically hidden therein; and separately printing second indicia on the surface, wherein the second indicia includes plural-bit data steganographically hidden therein, wherein said first indicia and second indicia are printed in alignment with each other.

12. The method of claim 1 wherein the orientation information is helpful in resolving at least one of scaling and rotation.

* * * * *